United States Patent
Huntzicker

(10) Patent No.: US 7,345,445 B2
(45) Date of Patent: Mar. 18, 2008

(54) AUTOMATIC SNOW REMOVAL WIPER SYSTEM

(75) Inventor: Fred W. Huntzicker, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 527 days.

(21) Appl. No.: 11/017,388

(22) Filed: Dec. 20, 2004

(65) Prior Publication Data

US 2006/0130877 A1  Jun. 22, 2006

(51) Int. Cl.
*B60S 1/08* (2006.01)

(52) U.S. Cl. ............... 318/444; 318/16; 15/250.12

(58) Field of Classification Search ............ 318/16, 318/443, 444; 15/250.001, 250.05, 250.12, 15/250.13, 250.17
See application file for complete search history.

(56) References Cited

U.S. PATENT DOCUMENTS

| 3,649,898 A | * | 3/1972 | Inoue ..................... 318/483 |
| 4,588,935 A | * | 5/1986 | Kaneiwa et al. ............ 318/483 |
| 5,017,847 A | * | 5/1991 | Leistenschneider ......... 318/443 |
| 5,672,946 A | * | 9/1997 | Kawashima et al. ........ 318/444 |
| 5,791,407 A |   | 8/1998 | Hammons |
| 6,072,295 A | * | 6/2000 | Kusunoki ................ 318/444 |
| 6,745,582 B1 |  | 6/2004 | Urbank et al. |
| 7,009,355 B2 | * | 3/2006 | Heo ..................... 318/483 |

FOREIGN PATENT DOCUMENTS

DE    3935563 A1    5/1990
JP    57074249 A    5/1982

* cited by examiner

*Primary Examiner*—Bentsu Ro

(57) ABSTRACT

A wiping system for use on a vehicle window comprises a window wiper assembly positioned proximate the window, a first sensor for detecting the presence of moisture on the window and a second sensor for detecting if the vehicle has been remotely started. A controller is coupled to the wiper assembly and to the first and second sensors and enables the wiper assembly when the vehicle has been remotely started and moisture is present on the window. The wiping system also comprises a third sensor for detecting the presence of moisture on the window, a fourth sensor for detecting vehicle shut-down, and a fifth sensor for sensing the temperature of the window. The controller is coupled to each of the third, fourth, and fifth sensors and enables the wiper assembly when the vehicle has been shut-down for less than a predetermined period of time, the temperature of the window exceeds a temperature threshold, and moisture is detected on the window.

20 Claims, 2 Drawing Sheets

US 7,345,445 B2

AUTOMATIC SNOW REMOVAL WIPER SYSTEM

FIELD OF THE INVENTION

The present invention relates generally to a vehicular window wiper system, and more particularly to a vehicular window wiper system particularly suited for diminishing the formation of ice on a vehicle's windshield.

BACKGROUND OF THE INVENTION

The formation of ice on vehicular windows is a well-known and problematic occurrence in cold environments. Ice may form on vehicle windows when snow contacts a heated window surface (e.g. heated from active defrosting elements or a heat source internal to the vehicle), melts, and freezes as the window surface cools (e.g. after all active defrosting elements and internal heat sources are no longer activated). Not only does the formation of ice obscure visibility, but it may also freeze automatic window wipers in place or simply decreases their effectiveness. Devices aiding in the removal of snow and ice are widely known and may take the form of, for example, conductive elements or heating strips that are embedded in a vehicle window. Devices of this type are commonly known as defrosters and work by increasing the temperature of the embedded conductive strips to heat the window thereby preventing the formation of ice and melting any ice already formed. Unfortunately, such defrosting systems may take an undesirably long period of time to melt enough ice to provide adequate visibility, especially if a large amount of ice is present and/or ambient temperature is low. Furthermore, it is impractical to operate a defrosting system when a vehicle's engine is not running due to vehicle battery limitations.

Also well-known and the subject of numerous patents are vehicular window wiping systems. Such systems employ at least one wiping member typically having a blade which contacts a vehicle window. A motor drives the wiping member across a portion of the window's surface to physically remove any accumulated snow or rain thereby helping to maintain driver visibility. Such systems also help minimize the above described formation of ice by sweeping away snow before it melts. However, it is often impracticable to operate such wiper systems after ignition shut-down (e.g. as when a vehicle is parked) again due to the vehicle's battery limitations. Furthermore, wiping systems of the type described above are relatively ineffective for removing ice after it has formed and may, as previously mentioned, freeze in place.

It is a common practice to use a manual cleaning tool to remove ice and snow. Such tools are well-known and may comprise a handle, a first end including an edged surface comprised of a hard material for scrapping ice off the window, and a second end comprising an edged surface of a soft material for removing moisture (i.e. a squeegee). Though such tools work reasonable well; their use requires time and energy. Also, such tools may not be able to substantially remove ice from wiper blades. Though this latter problem has been mitigated by providing wipers with integral heating elements or by providing vehicles with one or more fluid release nozzles positioned on a vehicle's hood or within a wiper blade assembly, such systems may be relatively complex and expensive to implement.

It should thus be appreciated that it would be desirable to provide an improved system for minimizing the accumulation of ice and snow on vehicle windows that is relatively inexpensive to implement and simple to use.

BRIEF SUMMARY OF THE INVENTION

According to an aspect of the invention there is provided a wiping system for use on a vehicle window comprising a window wiper assembly positioned proximate the window, a first sensor for detecting the presence of moisture on the window and a second sensor for detecting if the vehicle has been remotely started. A controller is coupled to the wiper assembly and to the first and second sensors and enables the wiper assembly when the vehicle has been remotely started and moisture is present on the window. The wiping system also comprises a third sensor for detecting the presence of moisture on the window, a fourth sensor for detecting vehicle shut-down, and a fifth sensor for sensing the temperature of the window. The controller is coupled to each of the third, fourth, and fifth sensors and enables the wiper assembly when the vehicle has been shut-down for less than a predetermined period of time, the temperature of the window exceeds a temperature threshold, and moisture is detected on the window.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the scope, applicability, or configuration of the invention in any way. Rather, the following description provides a convenient illustration for implementing exemplary embodiments of the invention. Various changes to the described embodiments may be made in the function and arrangement of the elements described herein without departing from the scope of the invention.

Figure 1:
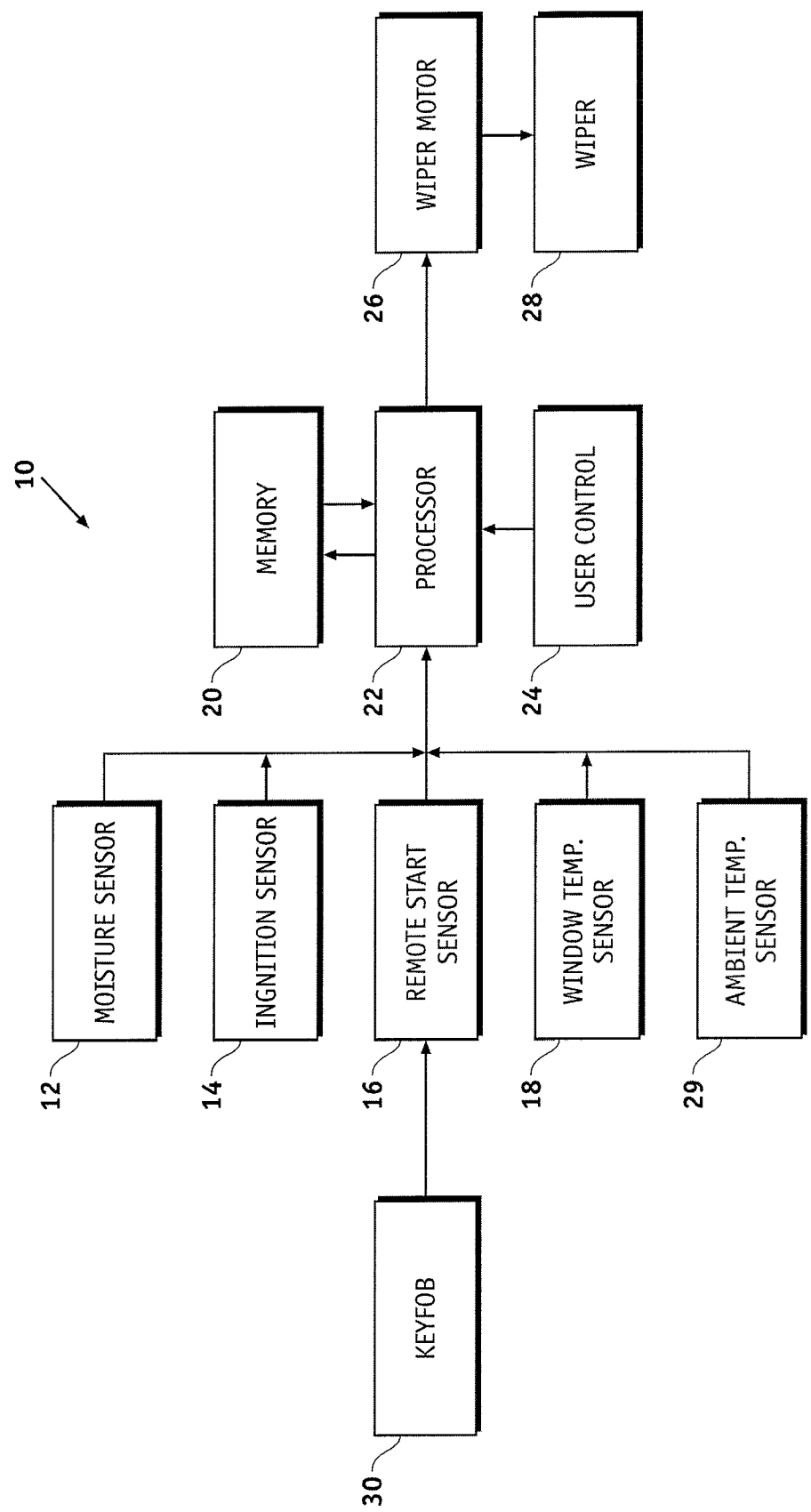
FIG. 1 is a block diagram of a vehicular window wiping system in accordance with the present invention.

FIG. 1 is a block diagram of a vehicular window wiping system 10 in accordance with the present invention. Wiping system 10 includes a processor or controller 22 for controlling a wiping apparatus comprising at least a motor 26 and a wiping member 28. As can be seen, processor 22 is provided with a first output coupled to an input of wiper motor 26 to enable the transmission of wipe signals or commands thereto, and a second output coupled to a memory 20 for the transmission of data thereto. Processor 22 is also provided with a plurality of inputs each coupled to outputs of separate data sources. These data sources comprise user input interface 24, memory 20, a moisture sensor 12, an ignition sensor 14, a remote start sensor 16, a window temperature sensor 18 and an ambient temperature sensor 29. Moisture sensor 12 detects the presence of moisture (e.g. water droplets) on the exterior of a vehicle window, and ignition sensor 14 the starting and stopping of a vehicle's engine. Remote start sensor 16 detects the reception of a remote start signal emitted, for example, by a wireless keyfob 30, and window temperature sensor 18 monitors the temperature of a vehicle's window. Ambient temperature sensor 29 monitors the outside air temperature. As is more fully explained below, processor 22 utilizes data provided by sensors 12, 14, 16, 18, and 29 to determine whether or not a wipe command should be transmitted to motor 26 that, in turn, drives wiper member 28.

Sensors capable of detecting moisture present on a window's surface (e.g. moisture sensor 12) are well-known in the art. One known type of moisture sensor employs a plurality of adjacent pairs of conductive strips coupled to a current detector and embedded on a window's surface. A processor monitors the current detector to determine the number of pairs of conductive strips contacted by moisture droplets and calculates therefrom the relative wetness of the window's surface. Another known moisture sensor, commonly referred to as optoelectronic rain sensor, employs optical sensors to determine light conditions from which the degree of surface wetness may be calculated. It should be appreciated that moisture sensor 12 may take either of these forms or any other form suitable for detecting the presence of moisture on a window's outer surface.

Memory 20 stores a set of predetermined conditions that determine the processing path taken by processor 22 and, ultimately, whether or not processor 22 delivers a wipe command to wiper motor 26. For example, memory 20 may store predetermined time and temperature thresholds. The time threshold represents a finite period of time during which processor 22 may activate wiper motor 26 after ignition sensor 14 senses that the vehicle is no longer running. If, for example, the time threshold is five minutes, wiping would continue for a five minute period following ignition shut-down if other conditions described below are satisfied.

In addition to a time threshold, memory 20 may store a temperature threshold that represents a temperature below which wiper motor 26 will not be enabled after ignition shutdown. Specifically, if window temperature sensor 18 indicates that the window temperature is less than or equal to the temperature threshold, processor 22 will not activate wiper motor 26. It is preferable that the temperature threshold be approximately equivalent to the freezing temperature of water. In this manner, wiping control system 10 may reduce the formation of ice by instructing wiper motor 26 and therefore wiper member 28 to sweep away snow when the window's surface is warm enough to melt snow, while conserving energy by not commanding wipes when the window's surface is too cold to melt snow. Wiping control system 10 is thus configured to substantially wipe away snow and water before it freezes on the vehicle's window.

In addition, memory 20 may store an ambient temperature threshold that represents a temperature above which wiper motor 26 will not be enabled after ignition shutdown or remote start activation. Specifically, if the air temperature sensor 29 indicates that the air temperature is greater than or equal to the ambient temperature threshold, processor 22 will not activate wiper motor 26. It is preferable that the temperature threshold be approximately equivalent to or somewhat greater than the freezing temperature of water (e.g. 45° F.). In this manner, wiping control system 10 need not operate when there is little chance of ice formation.

User input 24 may take any form suitable for enabling an operator to provide desired selection data. For example, user input 24 may simply comprise a single input (e.g. a button or switch) for activating the inventive wiping system. Alternatively, user input 24 may comprise an additional input for receiving operator selection data regarding wiper speed or auxiliary functions (e.g. audible or visual impending wipe alerts). If desired, user input 24 may also be utilized by an occupant of the vehicle to select preferred time and/or temperature thresholds. In this case, processor 22 would cause the changed time and/or temperature threshold to be stored in memory 20.

Figure 2:
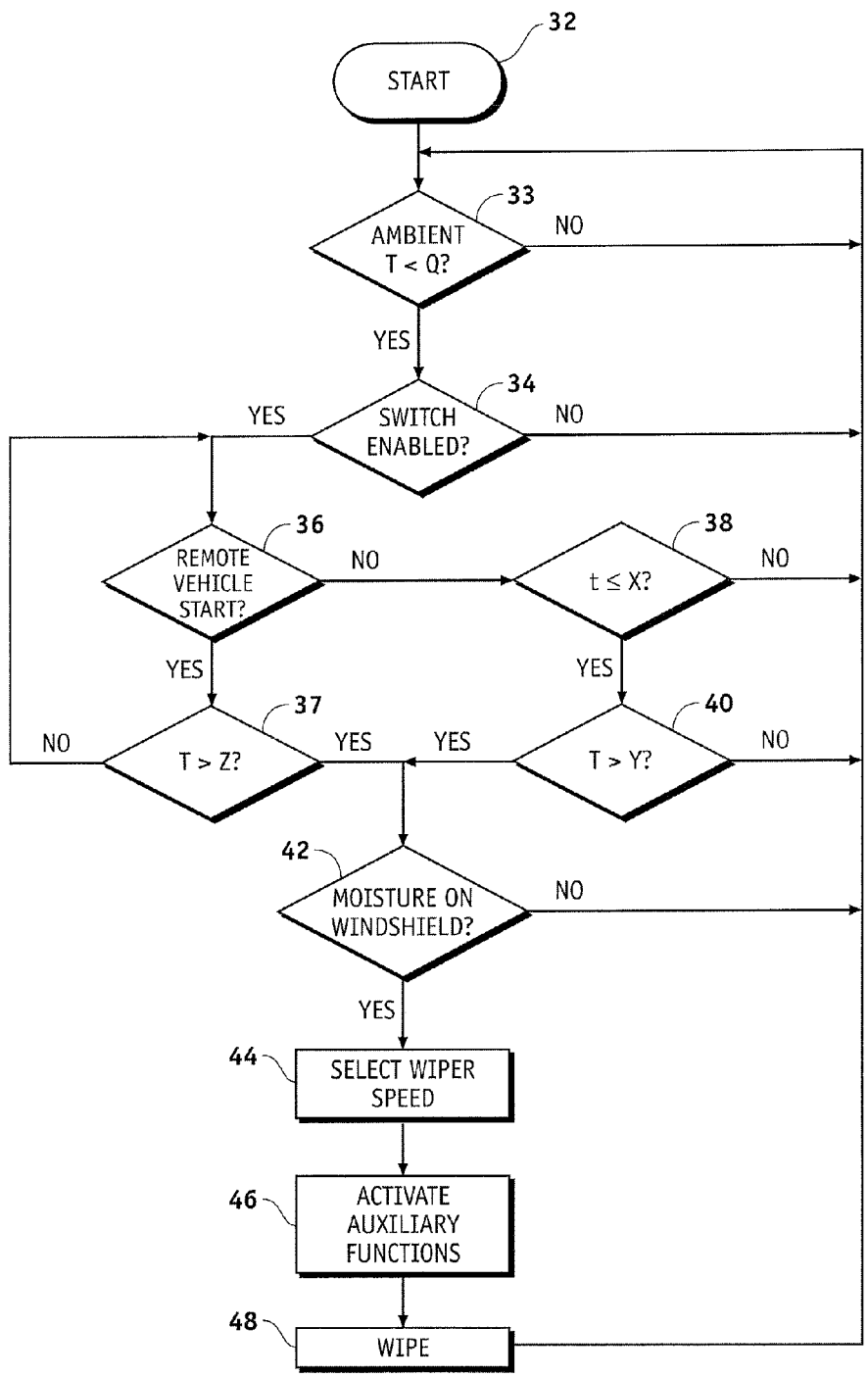
FIG. 2 is a flow chart of an operational process suitable for use in conjunction with the wiping system shown in FIG. 1.

FIG. 2 is a flow chart of the process carried out by inventive window wiping system 10 shown in FIG. 1. The process begins at START 32. Steps 34, 44, and 46 are dependent upon user-selection data received from user input 24 (FIG. 1), and steps 36, 38, and 42 are dependent upon data received from remote start sensor 16 (FIG. 1), ignition sensor 14 (FIG. 1), and moisture sensor 12 (FIG. 1) respectively. Steps 37 and 40 are dependent upon data received from window temperature sensor 18 (FIG. 1), and step 33 is dependent upon data received from ambient temperature sensor 29 (FIG. 1). Steps 38 and 40 are further respectively dependent on the time threshold (represented by the letter X) and the temperature threshold (represented by the letter Y) described hereinabove. Steps 33 and 37 are further respectively dependent on the temperature thresholds represented by the letters Q and Z.

The inventive wiping method may begin with a determination that the ambient temperature is below threshold Q as is shown at 33 and a determination that the wiping feature has been enabled as is shown at 34. The user may enable the system by means of user input 24 (FIG. 1) which may comprise a dedicated switch, a menu system, or other mechanism within a multifunctional display and control device. Alternatively, the vehicle may be configured such that the wiping feature is always enabled.

If the wiping feature is disabled, the wiping system remains dormant. If, however, the wiping feature has been enabled, processor 22 monitors the output of remote start sensor 16 to determine if the vehicle has been started (e.g. remotely by means of wireless keyfob 30) as is shown at 36. If the vehicle has been started, processor 22 interrogates moisture sensor 12 (FIG. 1) to determine if moisture is present on the window as is shown at 42. The absence of moisture on the window will result in the wiping function remaining dormant. If, however, moisture is detected on the window, and if the window temperature is above a temperature threshold Z as is shown at 37, a wiping phase (i.e. comprising processing steps 44, 46, and 48) will begin as will be more fully described below.

The wiping phase may be entered by means of a second path in FIG. 2. That is, if a vehicle start is not detected at 36, processor 22 monitors ignition sensor 14 and an internal timer to determine if the ignition has been turned off for more than a predetermined period of time X (stored in memory 20—FIG. 1) as is shown at 38. If the time period (e.g. five minutes) has elapsed, the wiping function remains dormant. In this manner, the system may prevent accumulation of snow during short parking periods without remaining continuously active. Since an objective is to prevent the freezing of precipitation and melted snow on the vehicle's window, the time period (X) should preferably be greater than the time it takes for the window to reach a freezing temperature.

If the elapsed time (t) is less than or equal to elapsed time threshold X, processor 22 monitors temperature sensor 18 (FIG. 1) to determine if the window's temperature is greater than a temperature threshold Y (e.g. freezing) stored in memory 20 as is shown at 40. If the temperature of the window is below freezing, it is assumed that accumulated snow will not melt and later freeze. Thus, in this particular case, wiping is not necessary. If, however, the window's temperature (t) is greater than the threshold (i.e. t>Y), processor 22 searches for moisture on the window as previously described.

To summarize, the wiping phase corresponding to steps 44, 46, and 48 may be reached by two paths. The first occurs when the system is enabled, the vehicle is started, the ambient temperature is below a threshold, moisture is present on the window, and the window is above a temperature (i.e. steps 33, 34, 36, 37, and 42). The second occurs within a predetermined period of time after an ignition cycle if the temperature of the window exceeds a threshold (e.g. freezing), the ambient temperature is below a threshold (e.g. freezing) and moisture is present on the window (i.e. steps 33, 34, 36, 38, 40, and 42).

Prior to the wiping phase, user selection data is provided via user input 24 (FIG. 1). Specifically, a user may select a desired wiping speed and activate various auxiliary features (e.g. visual, audible, and/or tactile alerts) (steps 44 and 46). This user selection data is stored in memory 20 and recalled during the wiping phase (i.e. processing steps 44 and 46). Thus, during such a wiping phase, processor 22 interrogates memory 20 regarding the user-selected wiping speed and user-actuated auxiliary features and signals wiper motor 26 accordingly. Actual wiping commences (i.e. step 48) as wiper motor 26 receives a wipe command from processor 22 and drives wiper 28 across the vehicle window.

It should thus be appreciated that an improved system for minimizing the formation of ice and snow on vehicle windows has been provided that is relatively inexpensive to implement and simple to use.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A wiping system for use on a window deployed on a vehicle, said system comprising:
    a window wiper assembly positioned proximate said window;
    a first sensor for detecting the presence of moisture on said window;
    a second sensor for detecting if said vehicle has been started;
    a third sensor for sensing ambient temperature;
    a fourth sensor for sensing the temperature of said window; and
    a controller coupled to said window wiper assembly, to said first sensor, to said second sensor, to said third sensor, and to said fourth sensor for enabling said wiper assembly if said vehicle has been started, moisture is detected on said window, ambient temperature is below a first temperature threshold, and the temperature of said window is above a second temperature threshold.

2. A wiping system according to claim 1 wherein said second sensor determines if said vehicle has been remotely started.

3. A wiping system according to claim 1 further comprising a fifth sensor coupled to said controller for detecting vehicle shut-down.

4. A wiping system according to claim 3 wherein said controller enables said window wiper assembly when said vehicle has been shut-down for less than a predetermined period of time, the temperature of said window exceeds said second temperature threshold, and moisture is detected on said window.

5. A wiping system according to claim 4 further comprising a user input interface coupled to said controller.

6. A wiping system according to claim 5 wherein said controller comprises:
    a processor; and
    a memory coupled to said processor, said memory storing said predetermined period of time, said first temperature threshold, and said second temperature threshold.

7. A wiping system according to claim 6 wherein said second temperature threshold is approximately the freezing point of water.

8. A wiping system according to claim 7 wherein said wiping system is activated via said user input interface.

9. A wiping system according to claim 7 wherein said vehicle window is a windshield.

10. A wiping system for use on a window deployed on a vehicle, said system comprising:
    a window wiper assembly positioned proximate said window;
    a first sensor for detecting the presence of moisture on said window;
    a second sensor for detecting vehicle shut-down;
    a third sensor for sensing the temperature of said window; and
    a controller coupled to said window wiper assembly, to said first sensor, to said second sensor, and to said third sensor for enabling said wiper assembly when said vehicle has been shut-down for less than a predetermined period of time, the temperature of said window exceeds a temperature threshold, and moisture is detected on said window.

11. A wiping system according to claim 10 further comprising a fourth sensor coupled to said controller for detecting if the vehicle has been remotely started.

12. A wiping system according to claim 11 further comprising a fifth sensor coupled to said controller for sensing ambient temperature.

13. A wiping system according to claim 11 wherein said controller enables said window wiper assembly if the vehicle has been remotely started and moisture is detected on said window.

14. A wiping system according to claim 13 further comprising a user input interface coupled to said controller.

15. A wiping system according to claim 14 wherein said controller comprises:
    a processor; and
    a memory coupled to said processor, said memory storing said predetermined period of time and said temperature threshold.

16. A wiping system according to claim 15 wherein said temperature threshold is approximately the freezing point of water.

17. A wiping system according to claim 16 wherein said vehicle window is a windshield.

18. A wiping system for use on a vehicle window, said system comprising:
    a window wiper assembly positioned proximate said window;

a first sensor for detecting the presence of moisture on said window;

a second sensor for detecting if the vehicle has been remotely started;

a third sensor for detecting vehicle shut-down;

a fourth sensor for sensing the temperature of said window; and a controller coupled to said window wiper assembly, to said first sensor, to said second sensor, to said third, and to said fourth sensor for enabling said wiper assembly when moisture is present on said window and said vehicle has been remotely started, and for enabling said wiper assembly when said vehicle has been shut-down for less than a predetermined period of time, the temperature of said window exceeds a temperature threshold, and moisture is detected on said window.

19. A method for wiping a vehicle window utilizing a wiper assembly, said method comprising:

detecting the presence of moisture on said window;

determining if said vehicle has been remotely started;

enabling said window wiper assembly if said vehicle has been remotely started and moisture is present on said window;

detecting vehicle shut-down;

monitoring the temperature of said window; and enabling said window wiper assembly when said vehicle has been shut-down for less than a predetermined period of time, the temperature of said window exceeds a temperature threshold, and moisture is present on said window.

20. A method for wiping a vehicle window utilizing a window wiper assembly, said method comprising:

tracking the amount of time elapsed after vehicle shut-down;

detecting the presence of moisture on said window;

monitoring the temperature of said window; and enabling said window wiper assembly when said vehicle has been shut-down for less than a predetermined period of time, the temperature of said window exceeds a temperature threshold, and moisture is present on said window.

\* \* \* \* \*